United States Patent
Jha et al.

(10) Patent No.: US 9,807,821 B2
(45) Date of Patent: Oct. 31, 2017

(54) NEUTRAL CELL HOST SOLUTION PROVIDING COMMUNICATION TO USER EQUIPMENTS ASSOCIATED WITH DIFFERENT WIRELESS PROVIDERS

(71) Applicant: Cisco Technology, Inc., San Jose, CA (US)

(72) Inventors: Vivek Jha, Bangalore (IN); Rajesh Pazhyannur, Milpitas, CA (US); Maulik Vaidya, Atlanta, GA (US)

(73) Assignee: Cisco Technology, Inc., San Jose, CA (US)

( * ) Notice: Subject to any disclaimer, the term of this patent is extended or adjusted under 35 U.S.C. 154(b) by 58 days.

(21) Appl. No.: 14/601,044

(22) Filed: Jan. 20, 2015

(65) Prior Publication Data

US 2016/0212798 A1    Jul. 21, 2016

(51) Int. Cl.
| | | |
|---|---|---|
| H04W 4/00 | (2009.01) | |
| H04W 92/20 | (2009.01) | |
| H04W 16/14 | (2009.01) | |
| H04W 36/22 | (2009.01) | |
| H04W 88/10 | (2009.01) | |

(52) U.S. Cl.
CPC ........... *H04W 92/20* (2013.01); *H04W 16/14* (2013.01); *H04W 36/22* (2013.01); *H04W 88/10* (2013.01)

(58) Field of Classification Search
CPC ........... H04W 84/045; H04W 36/0072; H04W 36/04; H04W 88/10
See application file for complete search history.

(56) References Cited

U.S. PATENT DOCUMENTS

| | | | | |
|---|---|---|---|---|
| 2012/0093125 A1* | 4/2012 | Hapsari | ............. | H04W 36/0016 370/331 |
| 2013/0143578 A1* | 6/2013 | Lekutai | ............. | H04W 36/0083 455/444 |
| 2014/0087740 A1* | 3/2014 | Nakamura | ............ | H04W 36/14 455/444 |
| 2014/0328182 A1* | 11/2014 | Gao | ...................... | H04W 28/08 370/236 |

(Continued)

FOREIGN PATENT DOCUMENTS

| | | | | |
|---|---|---|---|---|
| KR | WO 2014112803 A1 * | 7/2014 | ............ | H04W 56/00 |
| WO | WO2013/043577 | 3/2013 | | |
| WO | WO2014/112803 | 7/2014 | | |

OTHER PUBLICATIONS

EPO Jun. 24, 2016 Search Report and Written Opinion from European Application Serial No. 15197384.

(Continued)

*Primary Examiner* — Maharishi Khirodhar
(74) *Attorney, Agent, or Firm* — Patterson + Sheridan, LLP

(57) ABSTRACT

Systems and methods for providing host-neutral small cells include communicating with a first User Equipment (UE) at a small cell. The first UE communicates with the small cell via a first Evolved Node B (eNodeB) base station associated with a first Evolved Packet Core (EPC). The small cell further communicates with a second UE. The second UE communicates with the small cell via a second eNodeB base station associated with a second EPC. Although a different wireless carrier may be associated with each of the first and second UEs, they may both communicate with the host-neutral small cell.

20 Claims, 14 Drawing Sheets

(56) References Cited

U.S. PATENT DOCUMENTS

2015/0223075 A1* 8/2015 Bashar ............... H04W 16/14
                                                 370/329
2015/0289270 A1* 10/2015 Knapp .............. H04L 27/0006
                                                 455/452.1
2016/0007373 A1* 1/2016 Davydov ............ H04L 5/001
                                                 370/329

OTHER PUBLICATIONS

"3GPP TS 23.401 V8.0.0 (Dec. 2007) Technical Specification: 3rd Generation Partnership Project; Technical Specification Group Services and System Aspects; General Packet Radio Service (GPRS) enhancements for Evolved Universal Terrestrial Radio Access Network (E-UTRAN) access (Release 8)," 3GPP, 650 Route des Lucioles—Sophia Antipolis Valbonne—France, Dec. 2007; 167 pages http://www.qtc.jp/3GPP/Specs/23401-800.pdf.

* cited by examiner

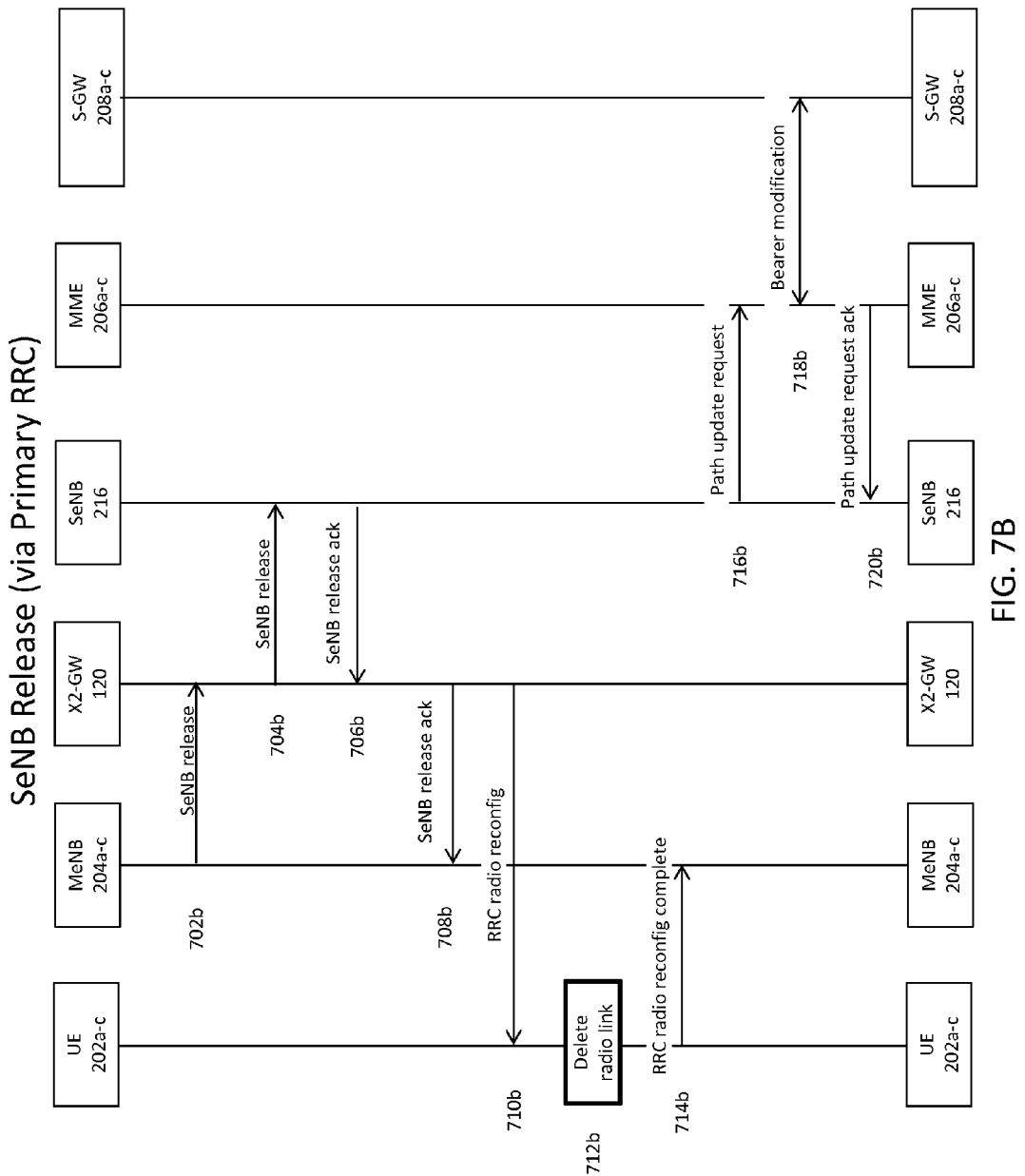

NEUTRAL CELL HOST SOLUTION PROVIDING COMMUNICATION TO USER EQUIPMENTS ASSOCIATED WITH DIFFERENT WIRELESS PROVIDERS

FIELD OF THE DISCLOSURE

This disclosure relates generally to systems, methods, and media for providing host-neutral small cells for improved data throughput.

BACKGROUND

Wireless networks are telecommunication networks that use radio waves to carry information from one node in the network to one or more receiving nodes in the network. Cellular telephony is characterized by the use of radio cells that provide radio coverage for a geographic area, with multiple cells arranged to provide contiguous radio coverage over a larger area. Wired communication can also be used in portions of a wireless network, such as between cells or access points.

Wireless communication technologies are used in connection with many user equipment, including, for example, satellite communications systems, portable digital assistants (PDAs), laptop computers, and mobile devices (e.g., cellular telephones). One benefit that users of such devices can obtain is the ability to connect to a network (e.g., the Internet) as long as the user is within range of such a wireless communication technology. Current wireless communication systems use either, or a combination of, circuit switching and packet switching in order to provide mobile data services to mobile devices. Generally speaking, with circuit-based approaches, wireless data is carried by a dedicated (and uninterrupted) connection between the sender and recipient of data using a physical switching path. Packet-based approaches, on the other hand, do not permanently assign transmission resources to a given session, and do not require the set-up and tear-down of physical connections between a sender and receiver of data. In general, a data flow in packet-based approaches is divided into separate segments of information or packets. The data flow may include a number of packets or a single packet.

Small cell access point devices are radio access point devices that are deployed at subscriber sites in order to improve coverage of mobile wireless communication service (e.g., cell phone, wireless messaging, etc.) and thereby offload the burden on the infrastructure of the mobile service provider. These cells may be known as femtocells or pico-cells (typically, picocells are more powerful and support more channels than femtocell access point devices). These devices function, essentially, as cellular (or "cell") transceiver towers. Like cell towers, they operate in a licensed spectrum that is subject to strict regulatory constraints on service providers.

Increasingly, small cells are being deployed by enterprises, such as large corporations that want to extend mobile communication capabilities inside their own buildings and other facilities where conventional cellular tower service (also referred to herein as "macro" service) might not be available. Small cells can allow open access in that both enterprise users and non-enterprise users can access the infrastructure. However, presently, these small cells only provide service to users belonging to a particular service provider's network.

BRIEF SUMMARY OF THE INVENTION

Various embodiments of the present disclosure provide communicating at a small cell between a first User Equipment (UE) and a first packet core and communicating at the small cell between a second UE and a second packet core.

BRIEF DESCRIPTION OF THE DRAWINGS

FIGS. 7A-7C are signal flow diagrams illustrating release of a small cell initiated by various network elements in accordance with some embodiments.

DESCRIPTION OF EXAMPLE EMBODIMENTS

Overview

Figure 1:
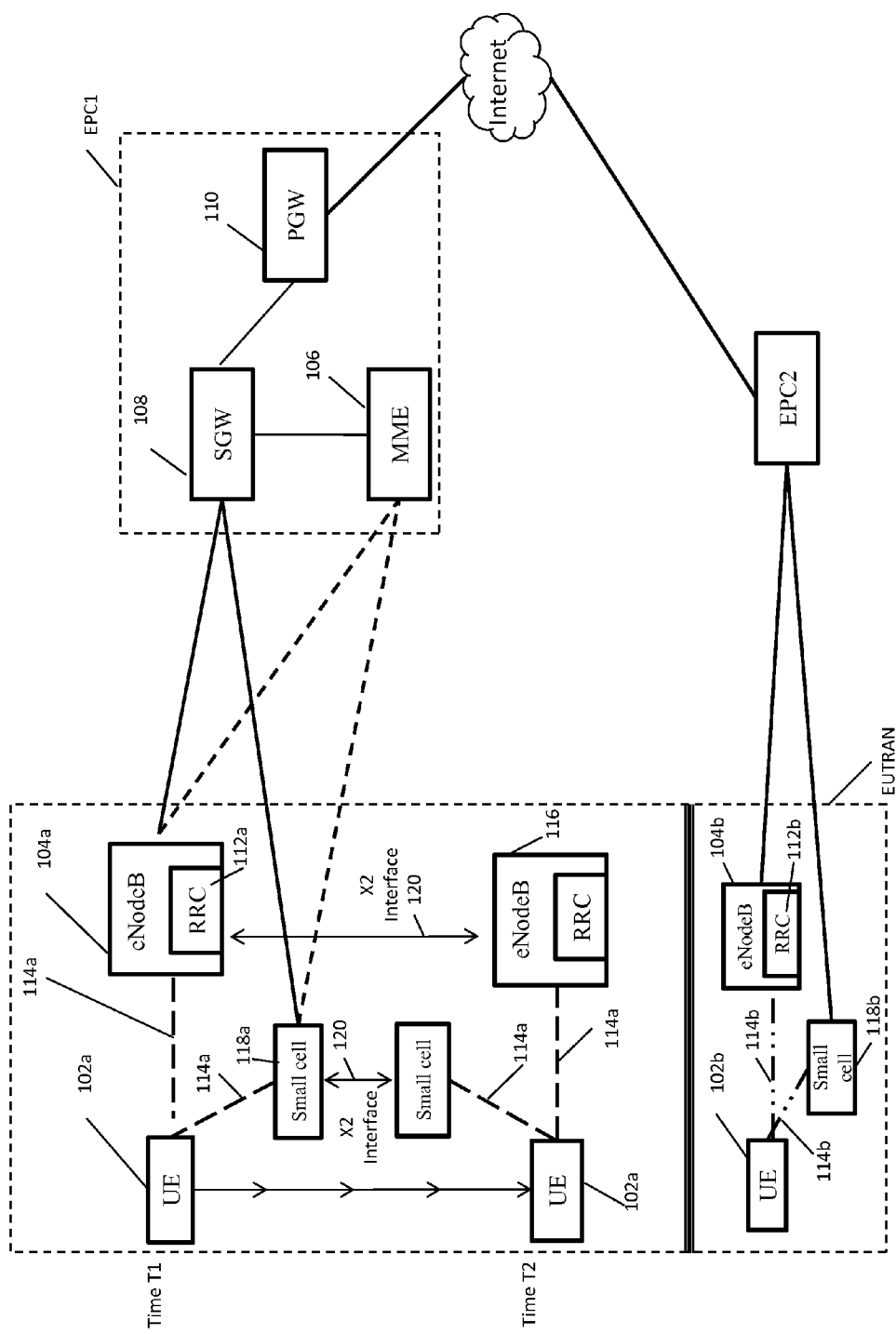
FIG. 1 illustrates a communication network in accordance with certain embodiments.

Embodiments may comprise communicating, at a small cell, between a first User Equipment (UE) and a first packet core, wherein the small cell communicates with the first UE over an unlicensed wireless protocol, and wherein the first UE and the first packet core are each associated with a first wireless provider, communicating, at a small cell, between a second UE and a second packet core, wherein the small cell communicates with the second UE over the unlicensed wireless protocol, and wherein the second UE and the second packet core are each associated with a second wireless provider, wherein the first wireless provider associated with the first UE and first packet core is different from the second wireless provider associated with the second UE and the second packet core, and wherein the small cell is registered with the first and second packet cores at the same time. The unlicensed wireless protocol can comprise License Assisted Access (LAA). The small cell and the UE can each further comprise a secondary Radio Resource Control (RRC). The first and second UEs can be respectively associated with a first and second wireless base station, each base station comprising a primary RRC. The secondary RRC can coordinate mobility of the first UE between the small cell and a second small cell. The small cell can communicate with the second small cell via an X2 interface. The mobility can be coordinated without use of the primary RRC associated with the first base station. In some embodiments, the method can further comprise associating the first UE with a third base station associated with the first wireless provider, and disassociating the first UE from the first base station, wherein the first UE remains connected to the small cell during the associating and dissociating. The first and second wireless providers can be associated with different wireless technologies. In some embodiments, the first and second UEs can communicate with the first and second wireless base stations over License Assisted Access (LAA).

Embodiments may comprise a network device further comprising a memory capable of storing data and a processor coupled to the memory, the network device can be configured to communicate, at a small cell, between a first User Equipment (UE) and a first packet core, wherein the small cell communicates with the first UE over an unlicensed wireless protocol, and wherein the first UE and the first packet core are each associated with a first wireless provider, communicate, at a small cell, between a second UE and a second packet core, wherein the small cell communicates with the second UE over the unlicensed wireless protocol, and wherein the second UE and the second packet core are each associated with a second wireless provider, wherein the first wireless provider associated with the first UE and first packet core is different from the second wireless provider associated with the second UE and the second packet core, and wherein the small cell is registered with the first and second packet cores at the same time. The unlicensed wireless protocol can comprise License Assisted Access (LAA). The small cell and the UE can each further comprise a secondary Radio Resource Control (RRC). The first and second UEs can be respectively associated with a first and second wireless base station, each base station comprising a primary RRC. The secondary RRC can coordinate mobility of the first UE between the small cell and a second small cell. The small cell can communicate with the second small cell via an X2 interface. The mobility can be coordinated without use of the primary RRC associated with the first base station. In some embodiments, the method can further comprise associating the first UE with a third base station associated with the first wireless provider, and disassociating the first UE from the first base station, wherein the first UE remains connected to the small cell during the associating and dissociating. The first and second wireless providers can be associated with different wireless technologies. In some embodiments, the first and second UEs can communicate with the first and second wireless base stations over License Assisted Access (LAA).

EXAMPLE EMBODIMENTS

Long Term Evolution (LTE) wireless networks serve large numbers of people in crowded areas. LTE speed and reliability is limited by the number of users interacting with a particular LTE base station. In congested environments, speed and reliability can suffer when the LTE channels of a network provider are saturated. Operators of 3GPP LTE wireless networks license their own particular bands of frequency that allow for User Equipment devices (UEs) to communicate with a base station over a semi-private channel. Channel space is limited, however, and increased volume of subscribers on the network leads to network congestion.

This problem is particularly noticeable inside large structures, for example, a large building that houses a corporate enterprise. Inside these buildings, thousands of subscribers may vie for bandwidth associated with only one base station per wireless provider. The limited space available for communication can lead to lost packets and generally poor throughput.

One solution to this problem is to place one or more mini wireless base stations inside of an enterprise. These mini base stations, or "small cells," can be placed throughout the congested area and can be designed to provide wireless coverage over a small range, e.g., 50 feet per cell. The small cell then communicates with the wireless providers evolved packet core (EPC) network via a wired network connection over the Internet. This solution would require a different small cell for each wireless provider, since the wireless providers each operate on different, incompatible frequencies. The small cell has an antenna, radio circuitry, a protocol processor, and interfaces to other devices.

To address these issues, host-neutral small cells are provided to replace proprietary small cells in a congested environment. The host-neutral small cells may connect to any LTE-enabled UE over the LAA protocol, which operates on an unlicensed 5 Ghz band. Even if the radios of two UEs are incompatible, they may both still connect to the same small cell using LTE-U.

FIG. 1 illustrates a communication network accordance with certain embodiments of the disclosure. FIG. 1 includes UEs 102a and 102b, evolved Node Bs (eNodeBs) 104a and 104b, mobility management entity (MME) 106, serving gateway (SGW) 108, PDN gateway (PGW) 110, Radio Resource Control layers (RRCs) 112a and 112b, wireless radio connections 114a and 114b, eNodeB 116, small cells 118a and 118b, and X2 Interface 120. RRCs 112a and 112b are control plane interfaces respectively residing within eNodeBs 104a and 104b. eNodeBs 104a and 104b are LTE network radio network components that connects to an Evolved UMTS Terrestrial Radio Access Network (E-UTRAN) as shown.

UEs 102a and 102b can be any devices with LTE functionality. UE 102a can connect to eNodeB 104a using connection 114a, and UE 102b can connect to eNodeB 104b using connection 114b. In one embodiment, UEs 102a and 102b each support LTE functionality from only one wireless carrier. In this embodiment, the wireless carrier supported by each of UEs 102a and 102b may be different. In this embodiment, UE 102a is unable to communicate with eNodeB 104b, and UE 102b is unable to communicate with eNodeB 104a. For example, in this embodiment, the frequencies used by the UEs to communicate with the respective eNodeBs can be different.

The LTE communication network includes a PDN gateway (PGW) 110, a serving gateway (SGW) 108, and a mobility management entity (MME) 106. The evolved packet core (EPC) of an LTE communications network includes MME 106, SGW 108 and PGW 110 components. In some embodiments, one or more EPC components can be implemented on the same gateway or chassis as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor and as the anchor for mobility between LTE and other 3GPP technologies (terminating S4 interface and relaying the traffic between 2G/3G systems and PGW). For idle state UEs, the SGW terminates the downlink data path and triggers paging when downlink data arrives for the UE. The SGW manages and stores UE contexts, e.g., parameters of the IP bearer service and network internal routing information.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks, such as WiMAX and 3GPP2 standards (CDMA 1x and EVDO). The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening.

MME 106 resides in the EPC control plane and manages node selection, session states, authentication, paging, mobility with 3GPP 2G/3G nodes, roaming, and other bearer management functions. The MME can be a standalone element or integrated with other EPC elements, including the SGW, PGW, and/or Release 8 Serving GPRS Support Node (SGSN). The MME can also be integrated with 2G/3G elements, such as the SGSN and GGSN. This integration is the key to mobility and session management interworking between 2G/3G and 4G mobile networks.

MME 106 is responsible for UE tracking and paging procedures including retransmissions. MME 106 handles the bearer activation/deactivation process and is also responsible for node selection of an SGW and PGW for a UE at the initial attach and at time of an intra-LTE handover. The MME also generates and allocates temporary identities to UEs and terminates Non-Access Stratum (NAS) signaling. The MME checks the authorization of the UE to camp on the service provider's Public Land Mobile Network (PLMN) and enforces UE roaming restrictions. The MME is the termination point in the network for ciphering/integrity protection for NAS signaling and handles the security key management. MME provides the control plane function for mobility between LTE and 2G/3G access networks with the S3 interface terminating at the MME from the SGSN (not shown).

UEs 102*a* and 102*b* can also be respectively connected to EPC1 and EPC 2 via small cells 118*a* and 118*b*. UE 102*a* can connect to small cell 118*a* using connection 114*a*, and UE 102*b* can connect to small cell 118*b* using connection 114*b*. Small cell 118*a* may further connect to EPC1, and small cell 118*b* may further connect to EPC2. Small cells 118*a* and 118*b* may be utilized in conjunction with eNodeBs 104*a* and 104*b* to provide higher overall throughput from the UEs to the EPCs.

eNodeBs can be interconnected via X2 interface 120. The X2 interface allows communication between neighboring eNodeBs to assist with handoff of UEs moving from one eNodeB to another. In general, only neighboring eNodeBs belonging to the same wireless provider can communicate via the X2 interface. In FIG. 1, eNodeBs 104*a* and 116 can belong to the same wireless provider. At some time, UE 102*a* can move locations from time T1 to time T2 as shown. In this case, UE 102, which is connected to eNodeB 104*a*, can be closer to eNodeB 116. eNodeB 104*a* can then handoff communication with UE 102*a* by communicating with eNodeB 122 via the X2 interface. Small cells belonging to the same wireless provider may also communicate over the X2 interface as shown in FIG. 1.

Mobility of a UE between eNodeBs and small cells is handled via the RRC within each eNodeB. For example, though not shown in FIG. 1, UE 102*a* may initially connect to small cell 118*a*, but later move out of range of that small cell. UE 102*a* may then connect to another small cell that is within its range. In this scenario, RRC 112*a* associated with eNodeB 104*a* would handle coordination between small cells to ensure a smooth transition between the small cells.

Figure 2:
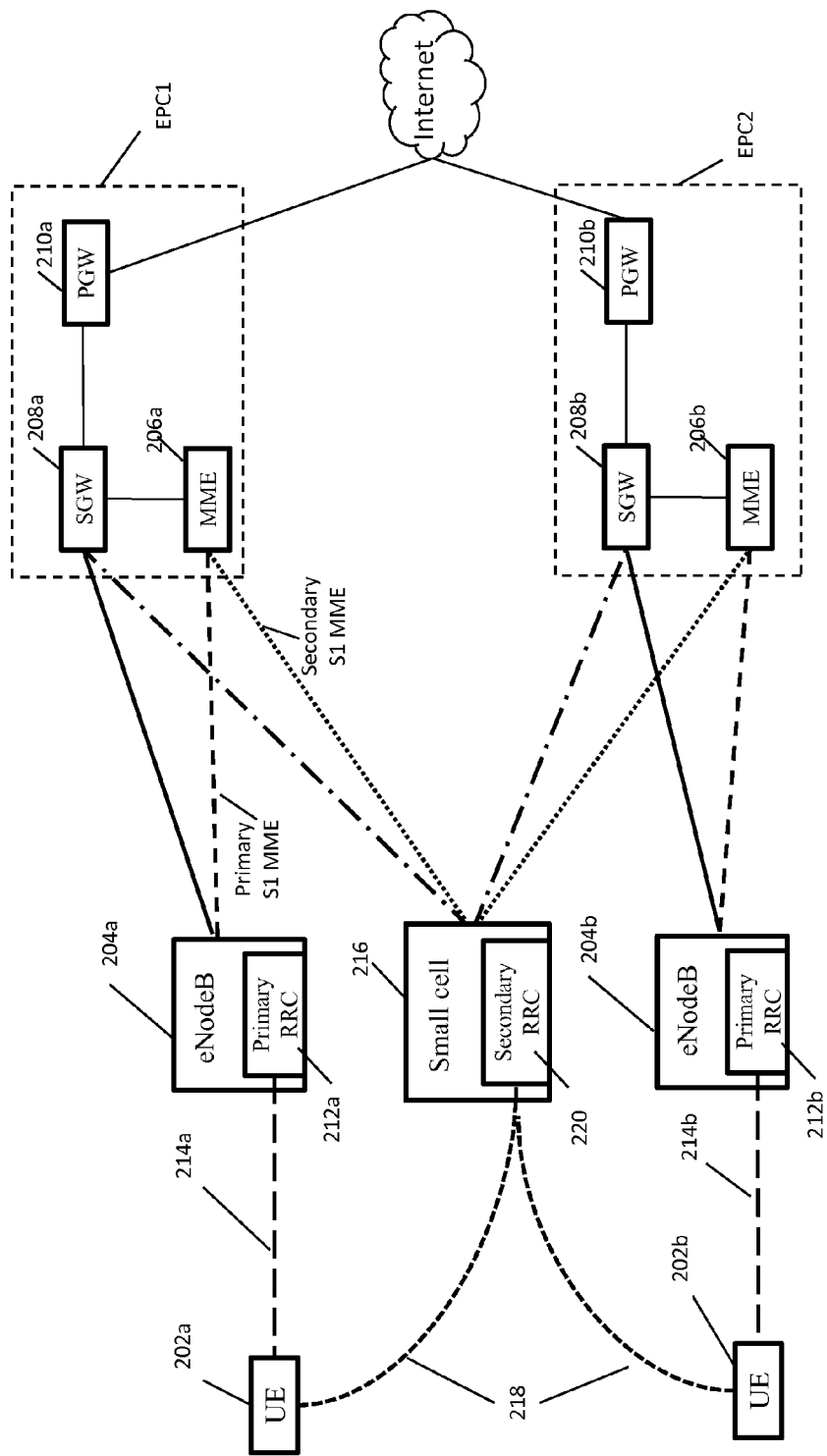
FIG. 2 illustrates a communication network incorporating a small cell in accordance with certain embodiments.

FIG. 2 illustrates a communication network utilizing a host-neutral small cell in accordance with certain embodiments of the disclosure. FIG. 2 includes UEs 202*a*, and 202*b*; eNodeBs 204*a* and 204*b*; primary RRCs 212*a* and 212*b*; connections 214*a* and 214*b*; small cell 216; connections 218; and secondary RRC 220. eNodeBs 204*a*-204*b* are LTE network radio network components that connect to respective E-UTRAN networks containing MMEs 206*a* and 206*b*; SGWs 208*a* and 208*b*; and PGWs 210*a* and 210*b*.

As in FIG. 1, UEs 202*a*-*b* can be any devices with LTE functionality. In FIG. 2, UEs 202*a* and 202*b* respectively connect to eNodeBs 204*a* and 204*b* using connections 214*a* and 214*b*. In FIG. 2, UEs 202*a*-202*b* support LTE functionality from different wireless carriers. In this embodiment, UEs 202*a*-202*b* each operate on different frequency spectrums utilizing different radio technologies, and thus UE 202*a* can communicate with eNodeB 204*a* and UE 202*b* can communicate with eNodeB 204*b* over LTE.

In addition to communicating with their respective eNodeBs 204*a*-204*b*, UEs 202*a*-202*b* can also communicate with the Evolved Packet Cores (EPCs) of their respective wireless networks by utilizing small cell 216. Small cell 216 can be a device capable of communicating with UEs 202*a*-202*b* and providing a connection to the EPC of each UE's wireless provider. Small cell 216 can simultaneously communicate with UEs 202*a*-202*b*, even though those UEs utilize LTE technologies from different wireless providers. Because small cell 216 can provide connectivity to multiple UEs from different carriers, small cell 216 is known as host-neutral.

Host-neutral small cell 216 can communicate with UEs 202*a*-202*b* over a band of an unlicensed wireless spectrum. In one embodiment, host-neutral small cell 216 can communicate with UEs 202*a*-202*b* using LAA, though this is not required, and the communication can occur over any unlicensed technology, such as Wi-Fi. LAA, or License Assisted Access, is an extension of the 3GPP LTE standard for use over the 5 GHz unlicensed band. Providing connectivity to UEs utilizing LAA allows host-neutral small cell 216 to provide enhanced reliability and throughput simultaneously to UEs belonging to various wireless carriers.

Host-neutral small cell 216 can further connect to the evolved packet cores respectively associated with each UEs 202*a*-202*b*. For example, host-neutral small cell 216 can connect to MME 206*a* and SGW 208*a* of EPC1 associated with UE 202*a* and eNodeB 204*a*, and MME 206*b* and SGW 208*b* of EPC2 associated with UE 202*b* and eNodeB 204*b*. Utilizing this architecture, host-neutral small cell 216 can provide increased throughput to UEs 202*a*-202*b* at the same time, despite each of these UEs belonging to a different wireless carrier.

As in FIG. 1, though not shown, mobility of a UE between small cells is handled via the RRC. However, unlike in FIG. 1, the host-neutral small cell in FIG. 2 has its own secondary RRC capable of handling mobility between small cells. For example, though not shown in FIG. 2, UE 202*a* may initially connect to small cell 216, but later move out of range of that small cell. UE 202*a* may then connect to another small cell that is within its range. In this scenario, secondary RRC 220 associated with small cell 216 would handle coordination between small cells to ensure a smooth transition between them. Because host-neutral small cell may communicate with the EPCs of multiple different carriers, usage of the primary RRC at eNodeB 212*a* is not desirable. Thus, this process utilizing the secondary RRC 220 would be transparent to eNodeB 204*a*, and would not involve use of the primary RRC 212*a*.

Figure 3A:
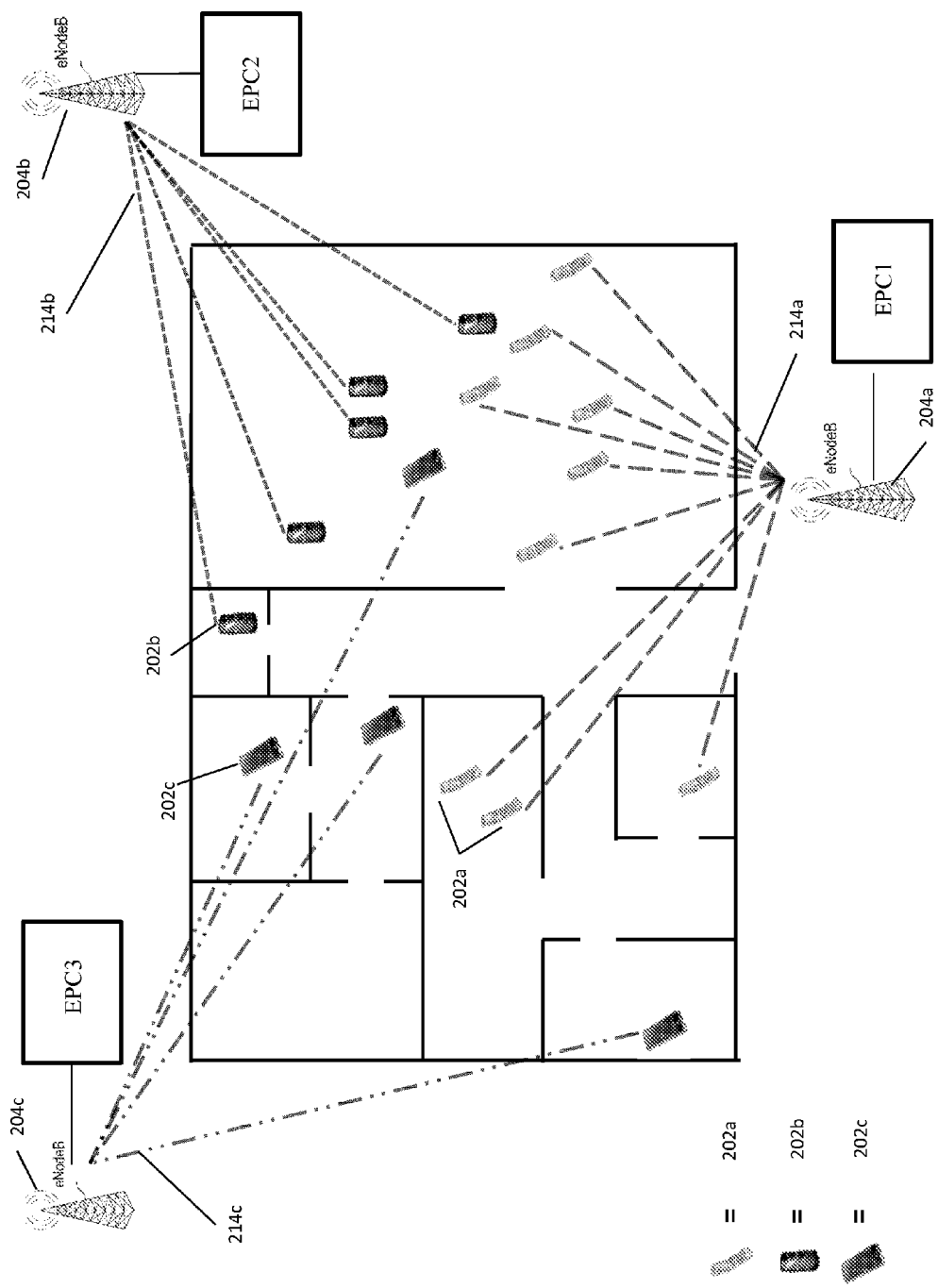
FIG. 3A is a depiction of typical network access in a congested enterprise environment.

FIG. 3A illustrates an exemplary congested environment in accordance with some embodiments of the disclosure. In one exemplary embodiment, FIG. 3A illustrates a typical distribution of UEs belonging to different service providers in an enterprise type environment. FIG. 3A illustrates exemplary interactions between the components of FIG. 2 in a real world deployment scenario. FIG. 3A includes three types of UEs—UE 202a, UE 202b, and a new UE 202c. In this figure, a plurality of UEs illustrated with the same image and label represent different UEs that belong to the same wireless provider. FIG. 3A further includes eNodeBs 204a, 204b, and a new eNodeB 204c; and connections 214a, 214b, and a new connection 214c.

UEs can be expected to be distributed throughout a building in an enterprise environment. FIG. 3A shows one such possible distribution of UEs. As discussed with respect to FIGS. 1 and 2, wireless providers each use different licensed frequency bands to implement LTE. Thus, UEs can only communicate with eNodeBs belonging to their wireless providers. As shown in FIG. 3A, UEs 202a communicate with eNodeB 202a, UEs 202b communicate with eNodeB 202b, and UEs 202c communicate with eNodeB 202c. FIG. 3A further illustrates that, for many devices, this solution is suboptimal, since the distance the signals must travel to reach the appropriate eNodeB may be through many walls. In addition, many UEs belonging to the same wireless provider may be in close proximity, saturating the wireless channel for a particular eNodeB and thus reducing signal quality and overall throughput.

Figure 3B:
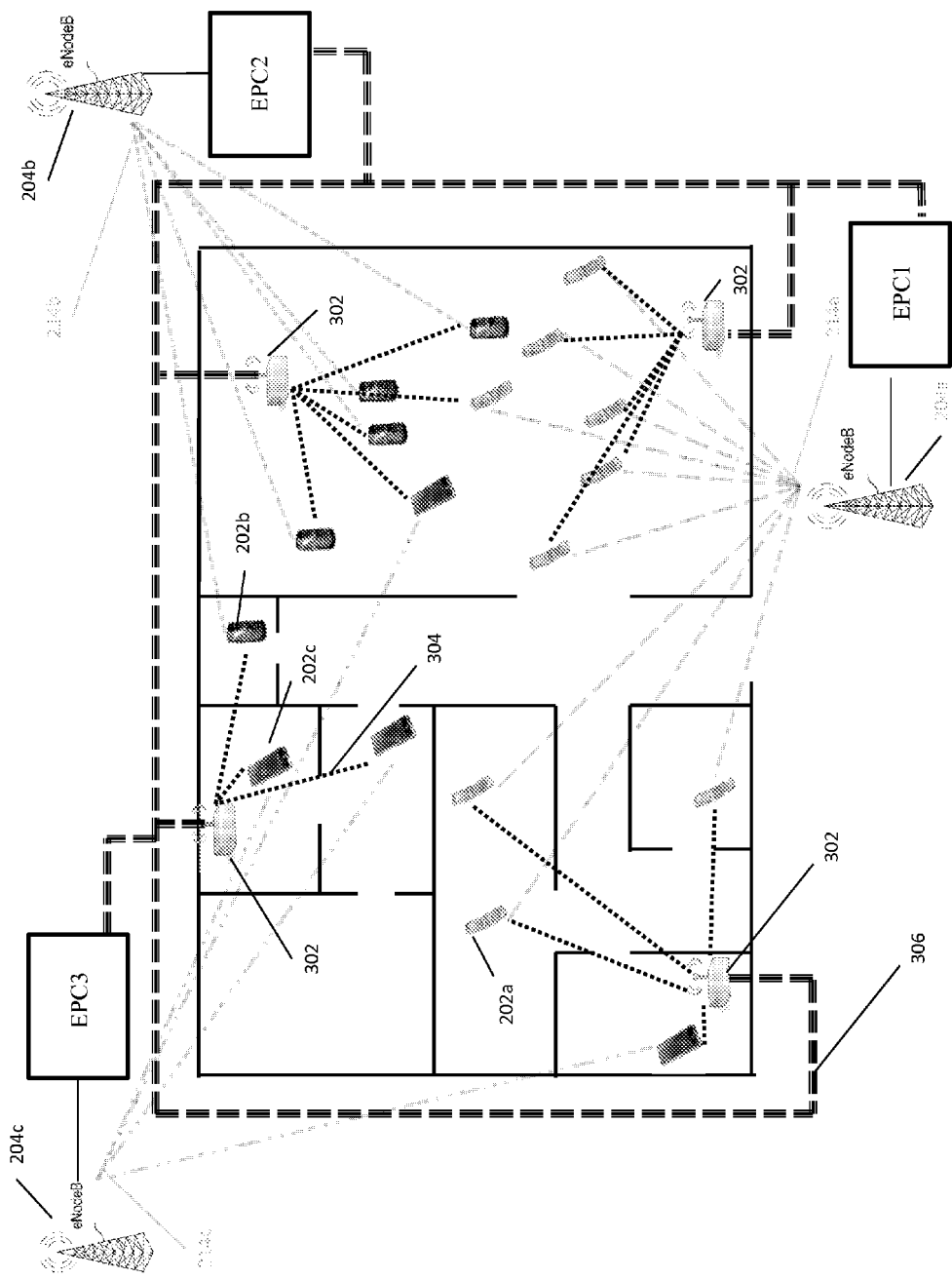
FIG. 3B is a depiction of network access incorporating host-neutral small cells in a congested enterprise environment.

FIG. 3B illustrates the exemplary congested environment of FIG. 3A, with deployed neutral host small cells to relieve congestion. In FIG. 3B, all UEs and eNodeBs maintain the same position as in FIG. 3A. However, FIG. 3B additionally contains host neutral small cells 302 strategically deployed throughout the environment. In the example of FIG. 3B, four host neutral small cells are deployed. UEs 202a-202c may then each communicate with the closest host-neutral small cell in the environment. As illustrated in FIG. 3B, UEs of type 202a, 202b, and 202c may each simultaneously connect to a single small cell over connection 304, despite using different wireless carriers. Connection 304 may be any wireless technology than can be implemented on UEs across carriers using different technologies. However, connection 304 is preferably implemented over an unlicensed frequency band. In one exemplary embodiment, connection 304 is implemented over LAA in the 5 GHz band.

Generally, UEs 202a-202c maintain their LTE connections to their respective eNodeBs 204a-204c, even after they connect to a host-neutral small cell 302. This allows the licensed LTE communication to maintain its position as the master link to the wireless carrier's EPC, and excess traffic, such as streaming video or other data-intensive browsing, may be offloaded to the EPC through the host-neutral small cell.

Each host neutral small cell 302 may connect to the EPC of any wireless carrier through connection 306, as is shown in FIG. 3B. Connection 306 can typically be a wired connection that provides communication between a host neutral small cell 302 and the EPC of a wireless carrier. Connection 306 will provide a logical connection to the ePDG of each wireless carrier with which the UEs communicate.

Figure 4A:
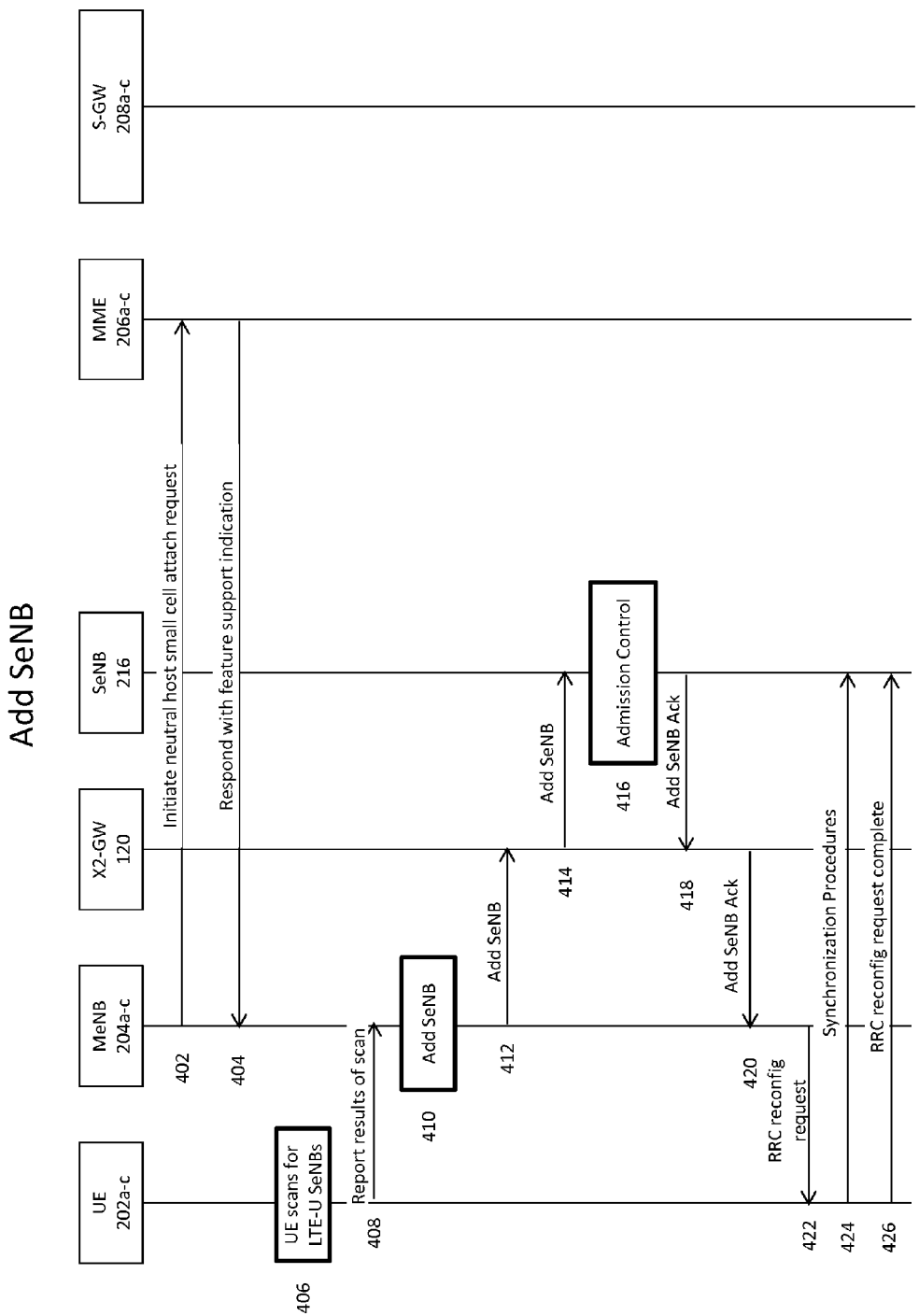
FIGS. 4A and 4B are signal flow diagrams illustrating small cell attachment procedures in accordance with some embodiments.
Figure 4B:
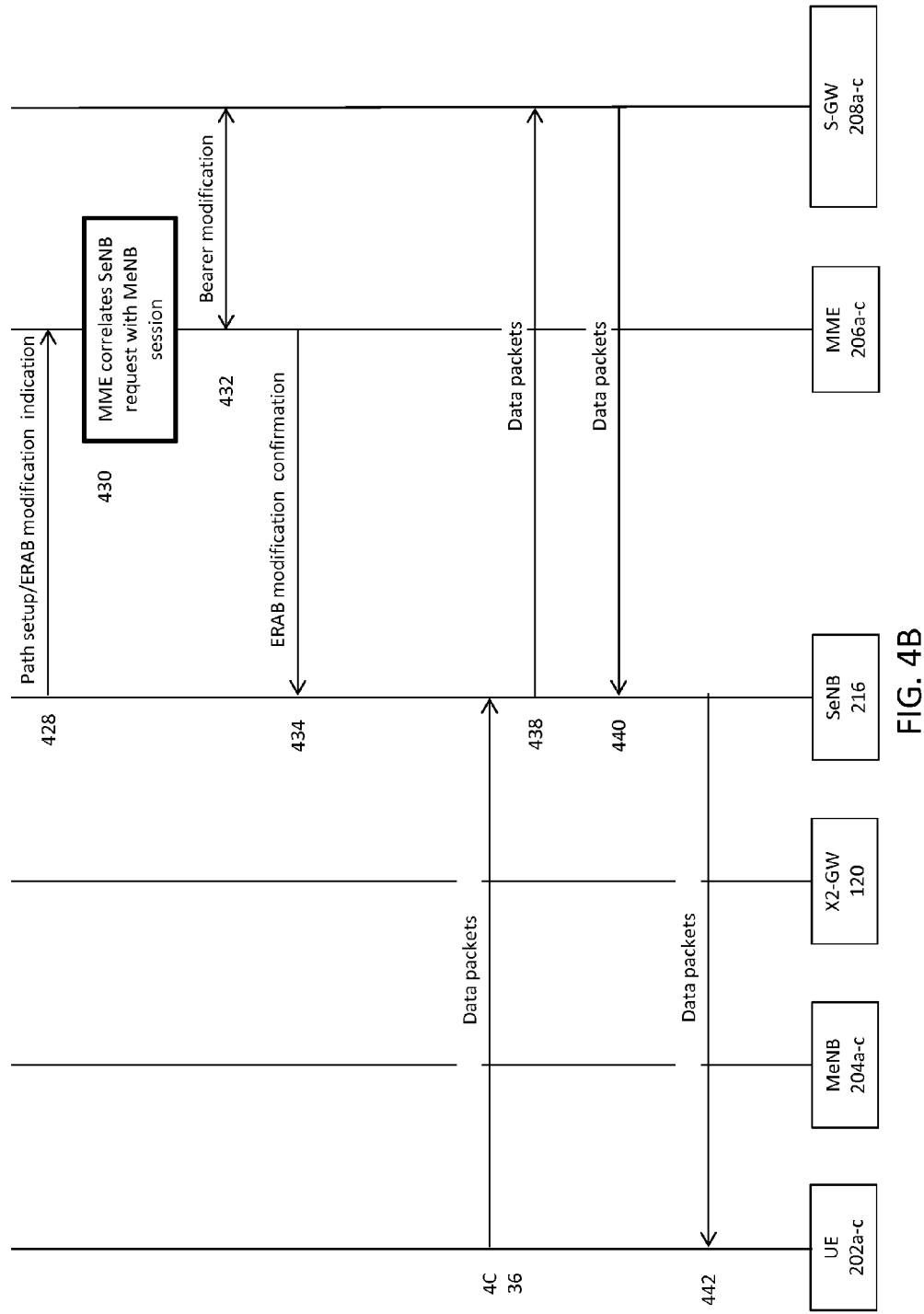

FIGS. 4A and 4B depict an exemplary packet flow for adding a host-neutral small cell to the data path for a UE in accordance with some embodiments of the disclosure. In FIGS. 4A and 4B, the eNodeB (corresponding to any of elements 204a-c of FIG. 2) is referred to as a "Master" eNodeB, or MeNB, and the host-neutral small cell (corresponding to element 216) is referred to as a "Secondary" eNodeB, or SeNB. Although the below description will be provided with reference to UE 202a and eNodeB 204a, it is appreciated that the flow is the same for any UE and eNodeB pair.

In FIG. 4A, MeNB 204a may recognize congestion amongst connected UEs. MeNB 204a may then send a neutral-host small cell attach request to MME 206a (flow 402). MME 206a may then respond with an indication as to whether that feature is supported (flow 404). Once MeNB 204a determines support for the feature exists, UE 202a may scan for available SeNBs (i.e., host-neutral small cells 216) (step 406). UE 202a may then forward the results of the scan to MeNB 204a (flow 408). If a suitable SeNB has been located, MeNB 204a may then initiate an add SeNB procedure (step 410). The add SeNB request may be forwarded from MeNB 204a to X2-GW 120 (flow 412), and then from X2-GW 120 to SeNB 216 (flow 414). The SeNB 216 may then perform admission control procedures based on the received request from the MeNB (step 416). The SeNB 216 may then send an add SeNB acknowledgment message to the X2 GW 120 (flow 418), and the X2 GW may forward the message back to the MeNB 204a (flow 420). MeNB 204a may then send a radio resource control (RRC) reconfiguration request to UE 202a (flow 422). UE 202a may then directly communicate with SeNB 216 to perform synchronization procedures (flow 424), and finally UE 202a may inform SeNB 216 the RRC reconfiguration request is complete (426).

In FIG. 4B, SeNB 216 may provide path setup information and an ERAB (E-UTRAN Radio Access Bearer) modification indication to the MME 206a (flow 428). At this stage, MME 206a may correlate the SeNB request with the appropriate MeNB session (step 430). MME 206a may then communicate with SGW 208a to provide bearer modification (flow 432). Once bearer modification is complete, MME 206a may provide an ERAB modification confirmation to SeNB 216. At this stage, SeNB attachment is complete. Data packets may then flow from UE 202a to SeNB 216 (flow 434), and from SeNB 216 to the evolved packet core of the UE's wireless provider through SGW 208a (flow 436). Data packets may also flow in reverse from SGW 208a to SeNB 216 (flow 438), and from SeNB 216 to UE 202a (flow 440).

Figure 5:
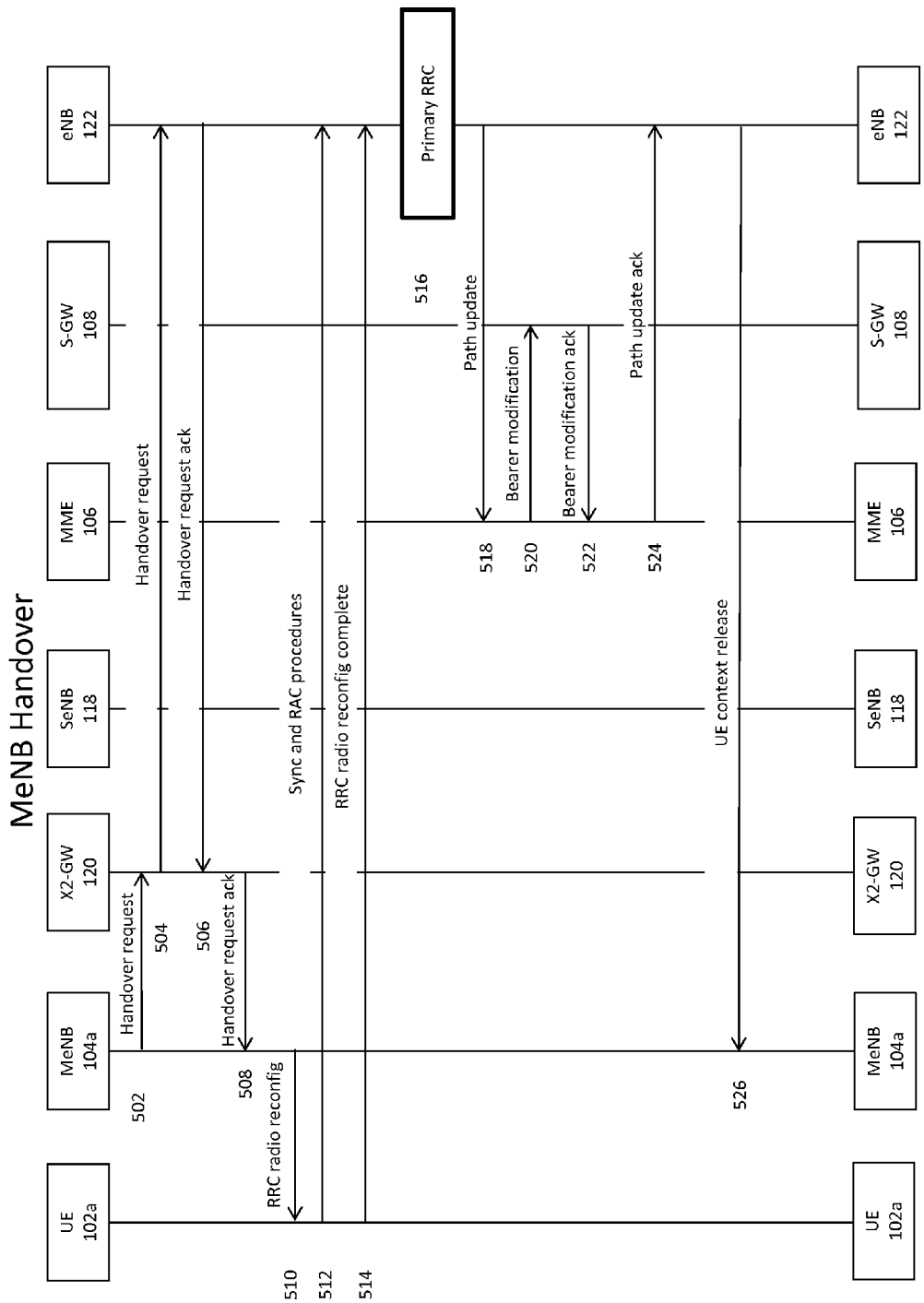
FIG. 5 is a signal flow diagram illustrating handover of a UE between eNBs in accordance with some embodiments.

FIG. 5 depicts an exemplary packet flow for handing over communication from one MeNB to another MeNB due to user mobility. The packet flow of FIG. 5, corresponds to the mobility of UE 102a between eNodeBs 104a and 122 and as illustrated in FIG. 1.

In FIG. 5, MeNB 104a may recognize that UE 102a is leaving its coverage area, and it may initiate a handover request to X2 GW 120 (flow 502). X2 GW 120 may then communicate the handover request to the closest eNodeB to UE 102a, e.g., eNodeB 122 (flow 504). eNodeB 122 may acknowledge the handover request to X2 GW 120 (flow 506), and X2 GW 120 may forward the acknowledgment to MeNB 104a (flow 508). MeNB 104a may then initiate RRC reconfiguration procedures at UE 102a (flow 510). UE 202a may then directly communicate with eNB 122 to perform synchronization and RAC procedures (flow 512), and finally UE 202a may inform eNB 122 the RRC reconfiguration request is complete (flow 514). At this point, eNB 122 becomes the primary RRC (step 516). eNB 122 then provides MME 106 with path update information for future communication (step 518). MME 106 then requests bearer modification from SGW 108 (flow 520), and SGW acknowledges bearer modification to MME 106 (step 520). MME 106 may then acknowledge the path update to eNB 122. Finally, eNB 122 communicates with MeNB 104a to release user context. At this point, handover of UE 102a from MeNB 104a to eNB 122 is complete.

Figure 6:
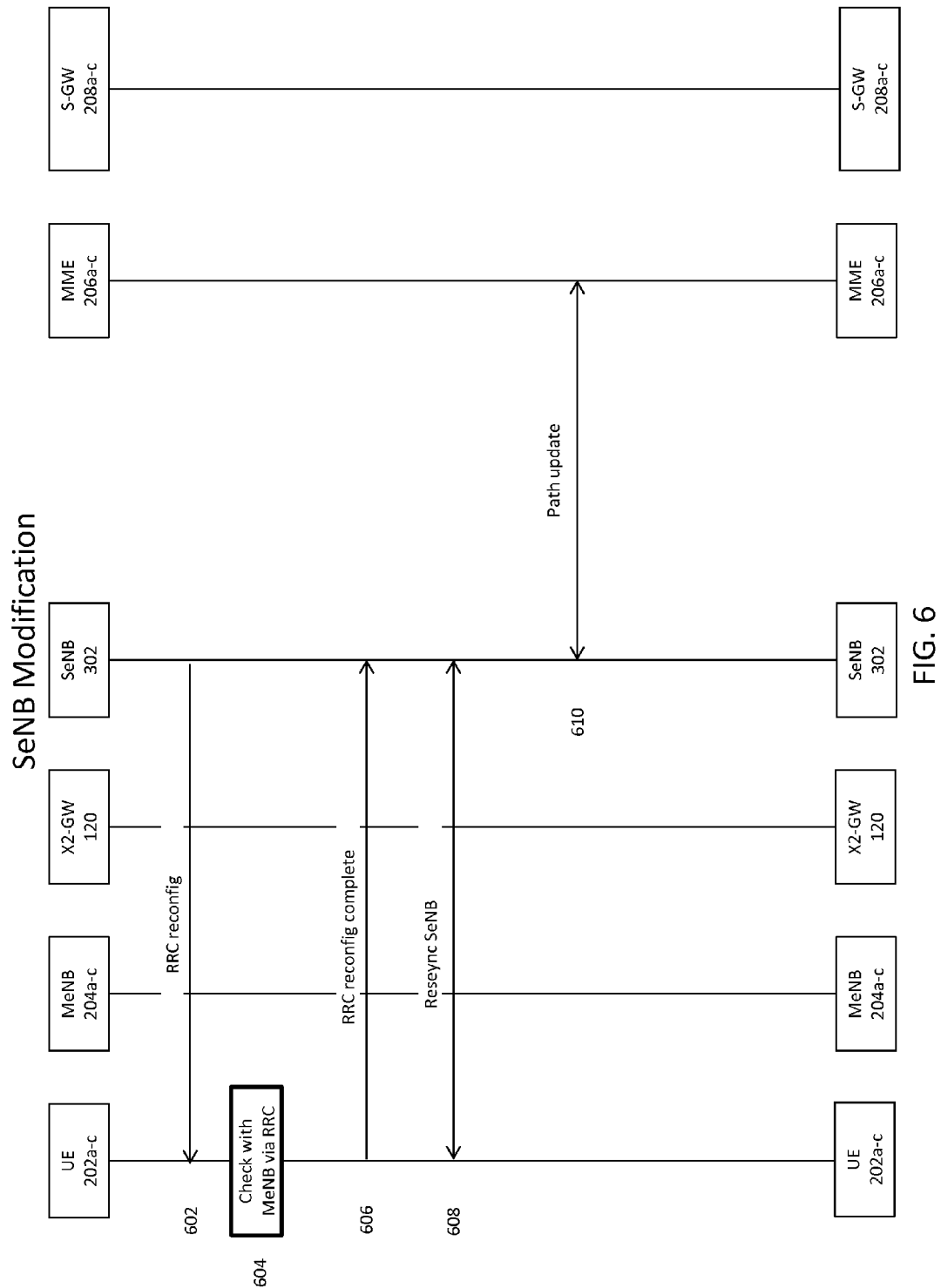
FIG. 6 is a signal flow diagram providing for modification of a small cell in accordance with some embodiments.

FIG. 6 depicts an exemplary packet flow for handing over communication from one SeNB to another SeNB due to user mobility. The packet flow of FIG. 6, corresponds to the mobility of any UEs 202a-202c between host neutral small cells 302 illustrated in FIG. 3B. In FIG. 6, host neutral small cells 302 are referred to as SeNBs.

In FIG. 6, SeNB 302 may recognize that UE 202a is leaving its coverage area, and it may send an RRC reconfiguration request to UE 202a (flow 602). UE 202a may then check with an associated MeNB (e.g., MeNB 202a) to determine whether another SeNB may be used in place of the current SeNB (step 604). UE 202a may then notify SeNB 302 that RRC reconfiguration is complete. UE 202a may then resync to another SeNB that is in closer proximity to the UE (flow 608). Finally, the new SeNB may notify MME 206a of the path update (flow 610).

Figure 7A:
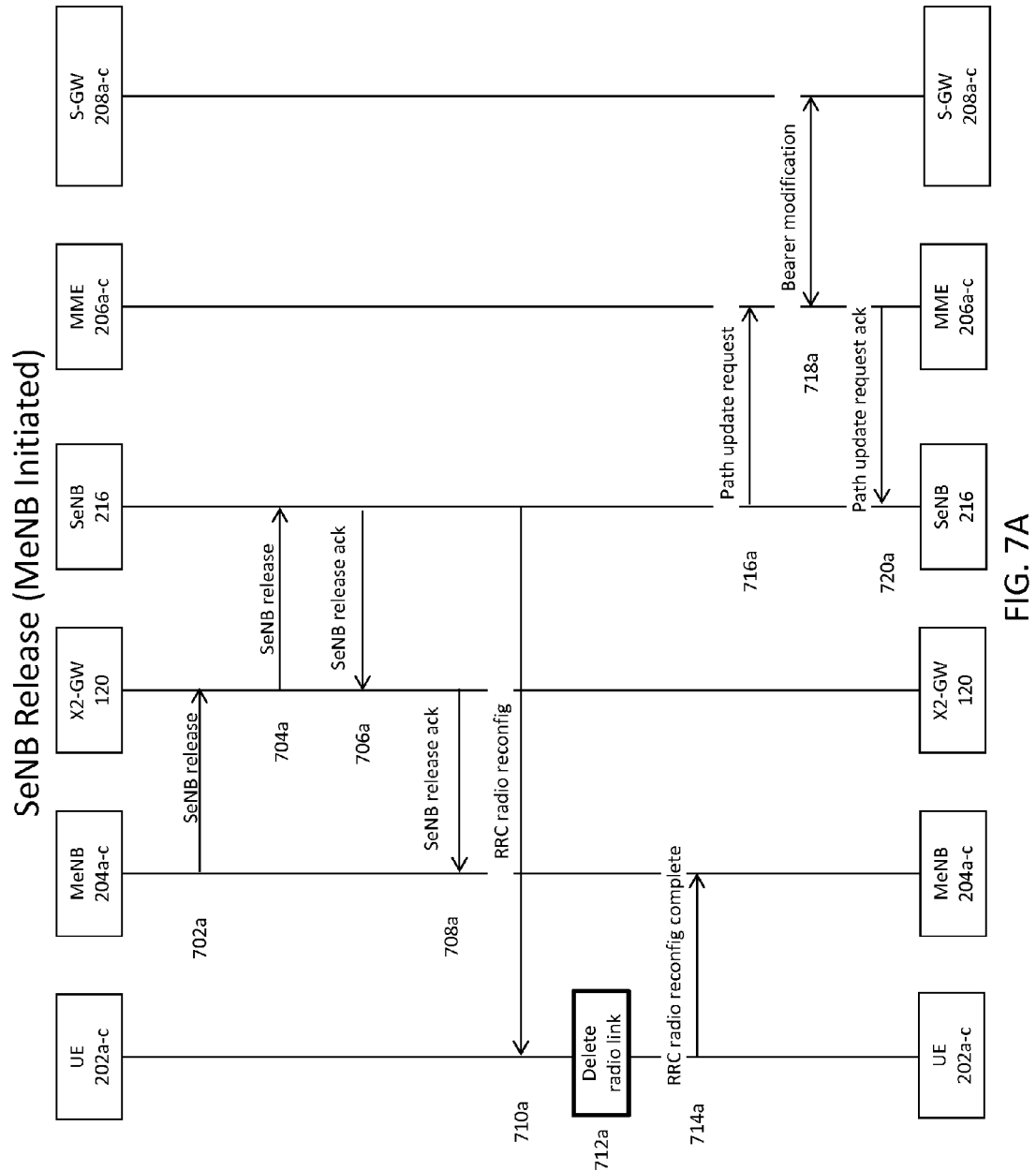
Figure 7C:
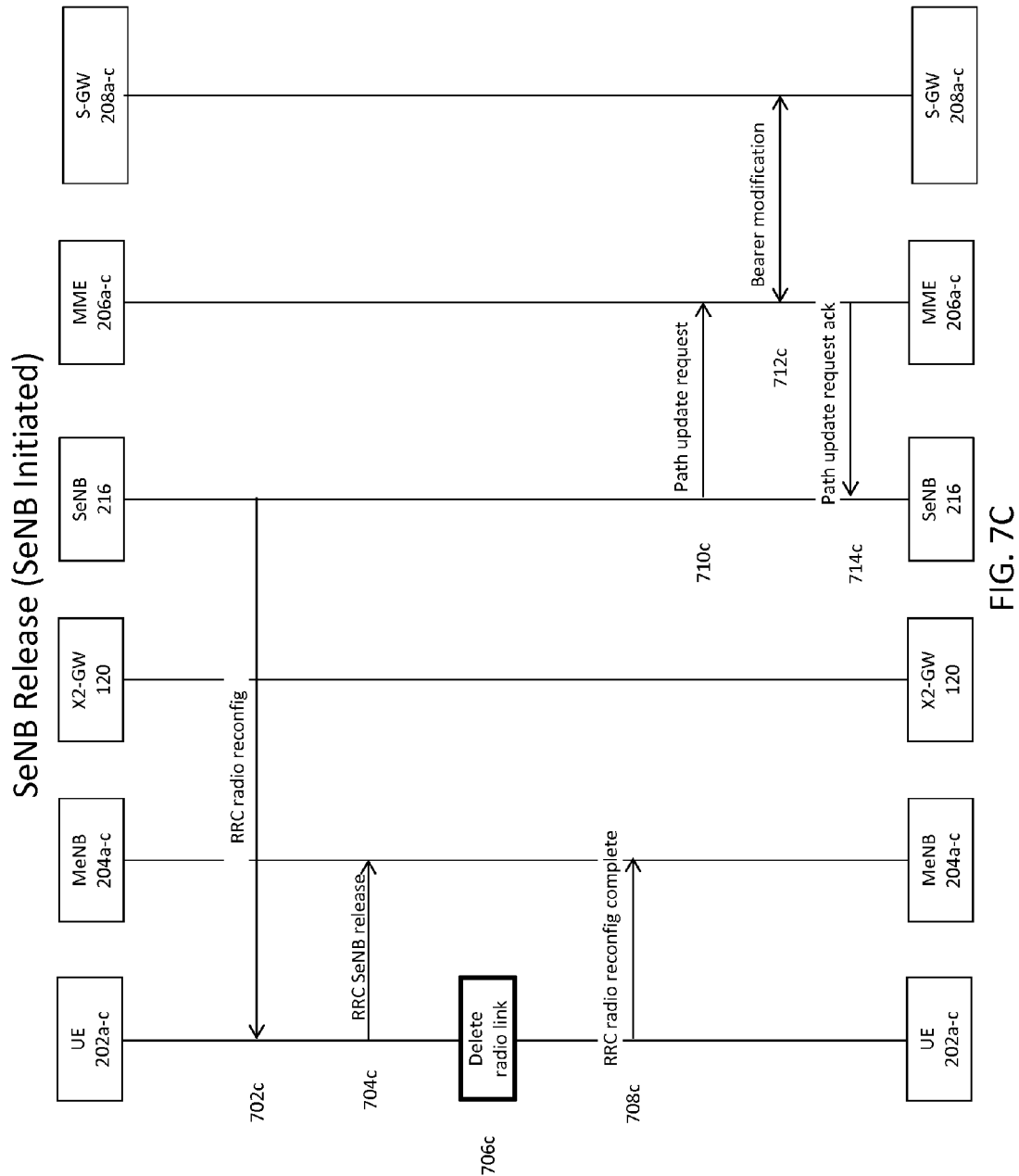

FIGS. 7A-7C depict exemplary packet flows for releasing a host-neutral small cell from the data path in accordance with some embodiments. FIG. 7A depicts the flow for releasing an SeNB initiated by the MeNB. FIG. 7B depicts the flow for releasing an SeNB via the RRC. FIG. 7C depicts the flow for releasing an SeNB initiated by the SeNB itself.

In FIG. 7A, MeNB 204a may choose to disconnect SeNB 216 from the network. MeNB 204a may then send an SeNB release request to the X2 GW 120 (flow 702a). X2 GW 120 may then forward the SeNB release request to SeNB 216 (flow 704a). SeNB 216 may then acknowledge the release request to the X2 GW (flow 706a), and the X2 GW may forward the acknowledgement to the MeNB 204a (flow 708a). SeNB 216 may then provide an RRC radio reconfiguration request to UE 202a (flow 710a). In response to the RRC radio reconfiguration request, UE 202a may delete the radio link to the SeNB 216 (step 712a). UE 202a may then message MeNB 204a to inform the MeNB that RRC radio reconfiguration is complete (flow 714a). SeNB 216 may then provide a path update request to MME 206a (flow 716a). The MME 206 may then communication with SGW 208a to provide bearer modification (flow 718a), and finally the MME 206a may provide SeNB 216 with an acknowledgment of the path update (flow 720a).

In FIG. 7B, MeNB 204a may choose to disconnect SeNB 216 from the network. MeNB 204a may then send an SeNB release request to the X2 GW 120 (flow 702b). X2 GW 120 may then forward the SeNB release request to SeNB 216 (flow 704b). SeNB 216 may then acknowledge the release request to the X2 GW (flow 706b), and the X2 GW may forward the acknowledgement to the MeNB 204a (flow 708b). X2 GW 120 may then provide an RRC radio reconfiguration request to UE 202a (flow 710b). In response to the RRC radio reconfiguration request, UE 202a may delete the radio link to the SeNB 216 (step 712b). UE 202a may then message MeNB 204a to inform the MeNB that RRC radio reconfiguration is complete (flow 714b). SeNB 216 may then provide a path update request to MME 206a (flow 716b). The MME 206 may then communication with SGW 208a to provide bearer modification (flow 718b), and finally the MME 206a may provide SeNB 216 with an acknowledgment of the path update (flow 720b).

In FIG. 7C, SeNB 216 may provide an RRC radio reconfiguration request to UE 202a (flow 702c). UE 202a may then provide MeNB 204a with an RRC SeNB release notification (flow 704c). In response to the RRC radio reconfiguration request, UE 202a may delete the radio link to the SeNB 216 (step 706c). UE 202a may then message MeNB 204a to inform the MeNB that RRC radio reconfiguration is complete (flow 708c). SeNB 216 may then provide a path update request to MME 206a (flow 710c). The MME 206 may then communication with SGW 208a to provide bearer modification (flow 712c), and finally the MME 206a may provide SeNB 216 with an acknowledgment of the path update (flow 714c).

Figure 8:
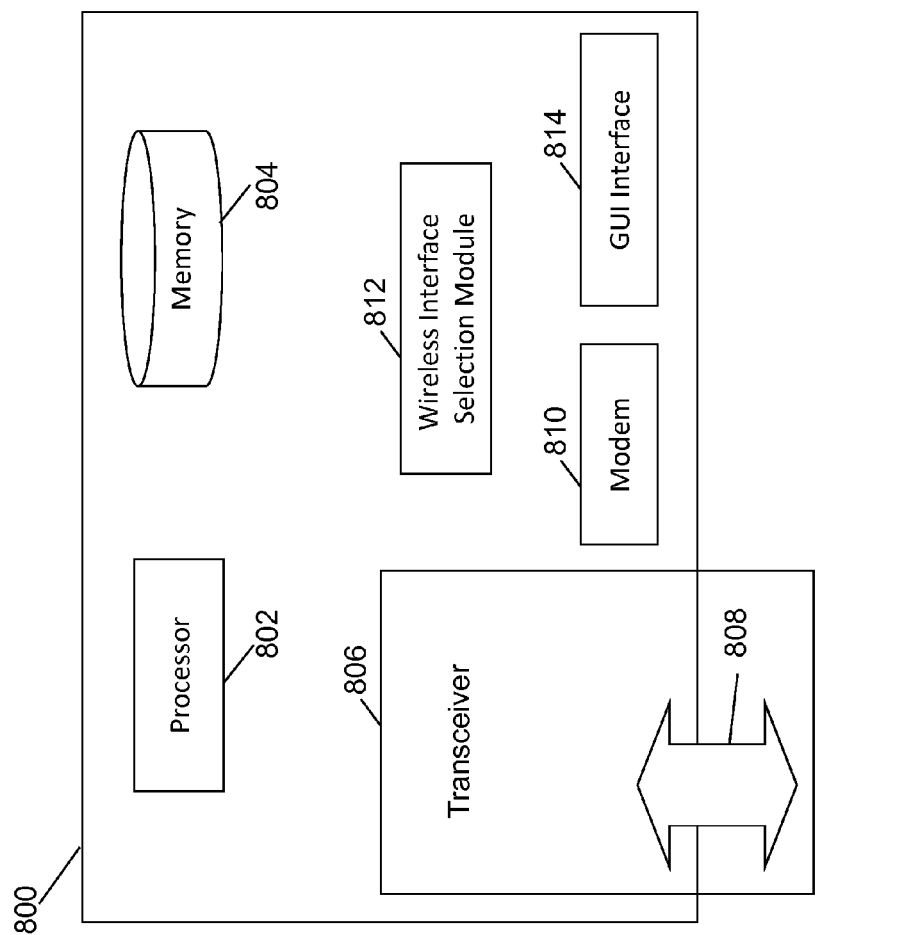
FIG. 8 is a logical diagram illustrating one implementation of a UE, according to some embodiments.

FIG. 8 illustrates a logical view 800 of user equipment (UE) 110 in accordance with certain embodiments. The UE 202a can include a processor 802, a memory 804, a transceiver 806 including an interface 808, a modem 810, a wireless interface selection module 812, and a GUI interface 814.

The transceiver 806 includes a transmitter and a receiver. The transmitter and the receiver can be integrated into a single chip or can be embodied in separate chips. The transceiver 806 can also include an interface 808 that provides an input and/or output mechanism to communicate with other network devices. The interface 808 can measure the wireless signal strengths of wireless interfaces such as base stations and access points. The interface 808 can be implemented in hardware to send and receive signals in a variety of mediums, such as optical, copper, and wireless, and in a number of different protocols some of which may be non-transient.

The modem 810 is configured to implement modulation and framing of signals according to one or more communication standards. The communication standards include the cellular standards defined under 3GPP.

The wireless interface selection module 812 is configured to select a wireless interface from which to receive network services. The wireless interfaces can include interfaces to different types of communication networks, including cellular networks and WLANs. Cellular networks can include LTE networks. A wireless interface for LTE networks can include a base station such as an eNodeB; a wireless interface for WLANs can include an access point.

The wireless interface selection module 812 can select the serving wireless interface by analyzing data load information associated with wireless interfaces. In certain embodiments, the wireless interface selection module 812 can be configured to attach to a wireless interface handling the least amount of data traffic and/or with more available resources. In certain embodiments, the wireless interface selection module 812 can also analyze additional information to decide to which wireless interface to connect. For example, the wireless interface selection module 812 can use one or more of the following: the load condition associated with the candidate wireless interfaces, the wireless signal strength associated with the candidate wireless interfaces, and a configuration status on the wireless interface selection module 812 indicating whether the UE 202A favors the cellular network or the WLAN.

The wireless interface selection module 812 can be implemented in software using memory 804 such as a non-transitory computer readable medium, a programmable read only memory (PROM), or flash memory. In some embodiments, the memory 804 can be used to implement the table 802 depicted in FIG. 8, which keeps track of which application or QoS corresponds to a particular reference cookie. The software can run on a processor 802 that executes instructions or computer code. The wireless interface selection module 812 may also be implemented in hardware using an application specific integrated circuit (ASIC), programmable logic array (PLA), or any other integrated circuit.

The GUI interface 814 can provide communication with an input and/or output mechanism to communicate with UE users. UE users can use input/output devices to send/receive data to/from the UE 202A over the GUI interface 110. Input/output devices can include, but are not limited to, a keyboard, a screen, a touch screen, a monitor, and a mouse. The GUI interface 814 can operate under a number of different protocols. The GUI interface 814 can be implemented in hardware to send and receive signals in a variety of mediums, such as optical, copper, and wireless.

The UE 202A described above can communicate with a plurality of radio access networks using a plurality of access technologies and with wired communication networks. The UE 202A can be a smart phone offering advanced features and capabilities, such as word processing, web browsing, gaming, e-book capabilities, an operating system, and a full keyboard. The UE 202A may run an operating system such as Symbian OS, iPhone OS, RIM's Blackberry, Windows Mobile, Linux, Palm WebOS, and Android. The screen may be a touch screen that can be used to input data to the UE 202A and the touch screen can be used instead of the full keyboard. The UE 202A may have the capability to run applications or communicate with applications that are provided by servers in the communication network. The UE 202A can receive updates and other information from these applications on the network.

The UE 202A also encompasses many other devices such as televisions (TVs), video projectors, set-top boxes or set-top units, digital video recorders (DVR), computers, netbooks, laptops, and any other audio/visual equipment that can communicate with a network. The UE 202A can also keep global positioning coordinates, profile information, or other location information in its stack or memory. The UE 202A can have a memory such as a computer readable medium, flash memory, a magnetic disk drive, an optical drive, a programmable read-only memory (PROM), and/or a read-only memory (ROM). The UE 202A can be configured with one or more processors 802 that process instructions and run software that may be stored in memory 804. The processor 802 can also communicate with the memory 804 and interfaces to communicate with other devices. The processor 802 can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 202A can also provide a variety of user interfaces (e.g., GUI Interface 814) such as a keyboard, a touch screen, a trackball, a touch pad, and/or a mouse. The UE 202A may also include speakers and a display device in some embodiments.

Any of the network components specified in this disclosure can be implemented, at least in part, in a network device in some embodiments. This network device can implement multiple and different integrated functionalities. In some embodiments, one or more of the following additional functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a session initiation protocol (SIP) server, a proxy-call session control function (P-CSCF), and an interrogating-call session control function (I-CSCF), a serving gateway (SGW), a mobility management entity (MME), a mobility access gateway (MAG), an HRPD serving gateway (HSGW), a local mobility anchor (LMA), a packet data serving node (PDSN), a foreign agent (FA), and/or home agent (HA). The CVR scheme can be implemented on network devices of the same type, implementing the same set of functionalities.

In certain embodiments, the functionalities are provided by a combination of hardware and software in the network device. General purpose hardware can be configured in the network device to provide one or more of these specialized functionalities. If the network device is serving as a gateway, the gateway can be implemented as any combination of the following: an xGSN, an xGW, an xGW-SGW, and an xGW-PGW.

Figure 9:
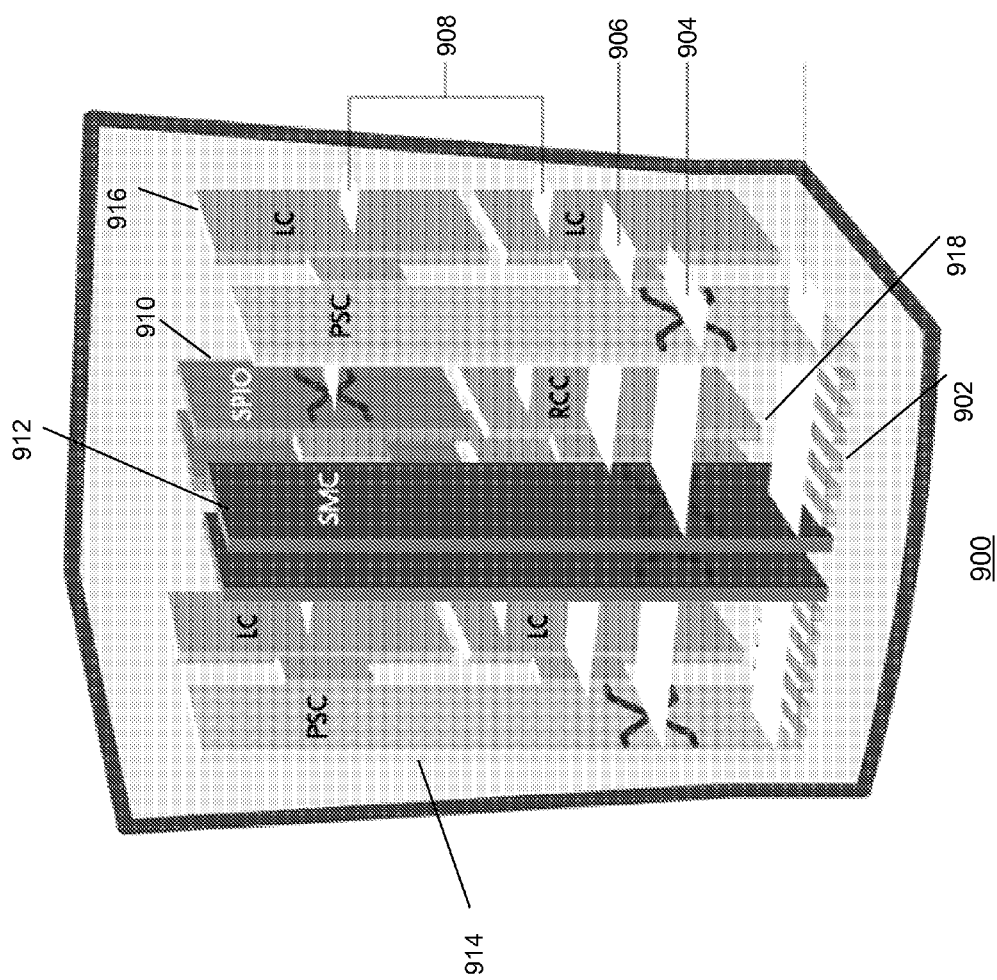
FIG. 9 illustrates the implementation of a network device, according to some embodiments.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 9 illustrates the implementation of a network device 900 in accordance with some embodiments. The network device 900 includes slots 902 for loading application cards and line cards. A midplane can be used in the network device 900 to provide intra-network device communications, power connections, and transport paths between the various installed cards. The midplane can include buses such as a switch fabric 904, a control bus 906, a system management bus, a redundancy bus 908, and a time division multiplex (TDM) bus. The switch fabric 904 is an IP-based transport path for user data throughout the network device 900 implemented by establishing inter-card communications between application cards and line cards. The control bus 906 interconnects the control and management processors within the network device 900. The network device management bus provides management of system functions such as supplying power, monitoring temperatures, board status, data path errors, card resets, and other failover features. The redundancy bus 908 provides transportation of user data and redundancy links in the event of hardware failures. The TDM bus provides support for voice services on the system.

The network device 900 supports at least four types of application cards: a switch processor I/O card (SPIO) 910, a system management card (SMC) 912, a packet service card (PSC) 914, and a packet accelerator card (not shown). Other cards used in the network device 900 include line cards 916 and redundant crossbar cards (RCC) 918. The line cards 916, when loaded in the network device 900, provide input/output connectivity to the network and other devices, as well as redundancy connections. The line cards 916 include interfaces to the network through Ethernet, Fiber Optic, and/or any other communication mediums. The redundant crossbar card (RCC) 918 includes a non-blocking crossbar and connections to each of the cards in the network device 900. This allows a redundant connection to be made through the redundant crossbar card 918 from any one card to any other card in the network device 900. The SPIO card 910 serves as a controller of the network device 900 and is responsible for such things as initializing the network device 900 and loading software configurations onto other cards in the network device 900.

The system management card (SMC) 912 and switch processor card (not shown) are system control and management cards for managing and controlling other cards in the network device 900. The packet accelerator card (PAC) and packet service card (PSC) 914 provide packet processing, context processing capabilities, and forwarding capabilities among other things. The PAC and PSC 914 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device 900 such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The software in the network device 900 can be divided into a series of tasks that perform specific functions. These tasks communicate with each other as needed to share control and data information throughout the network device 900. A task is a software process that performs a specific function related to system control or session processing. Three types of tasks operate within the network device 900 in some embodiments: critical tasks, controller tasks, and manager tasks. The critical tasks control functions that relate to the ability of the network device 900 to process calls such as network device initialization, error detection, and recovery tasks. The controller tasks mask the distributed nature of the software from the user and perform tasks such as monitoring the state of subordinate manager(s), providing for intra-manager communication within the same subsystem, and enabling inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device (e.g., network device 900) include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node (e.g., user equipment 110), the session subsystem can setup a MIPv4 termination and setup a PMIPv6 session towards the core network. A session manager can track the mapping of the sessions and processing to provide the emulation and inter-working between the networks. A database can also be used to map information between the sessions, and store, for example, NAI, HoA, AE information in some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power.

Figure 10:
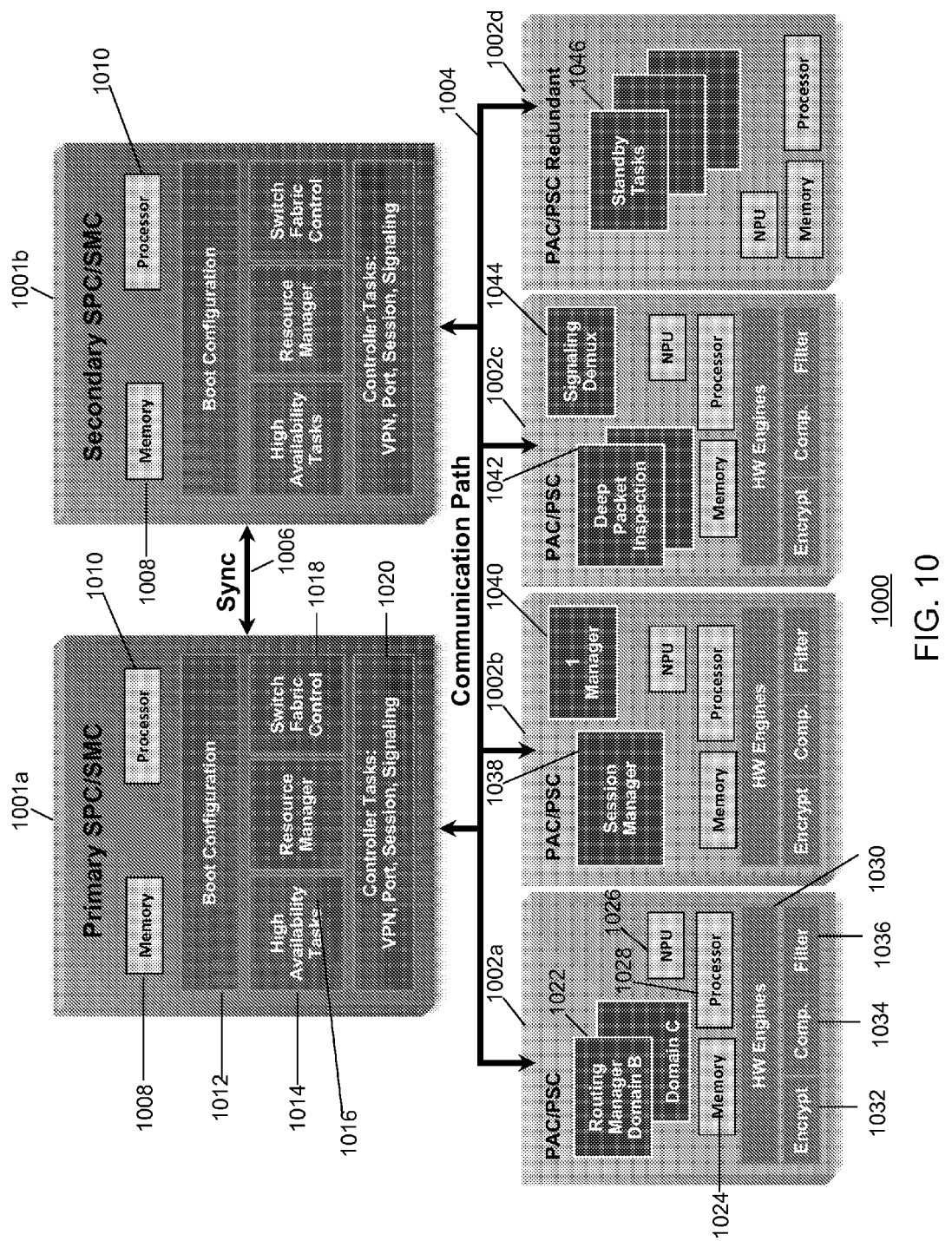
FIG. 10 is a logical view of the software architecture of a network device, according to some embodiments.

FIG. 10 illustrates a logical view 1000 of the software architecture of a network device (e.g., network device 1000) in accordance with certain embodiments. As shown, the software and hardware can be distributed within the network device and across different circuit boards, processors, and memory. FIG. 10 includes a primary switch processor card (SPC)/system management card (SMC) 1000a, a secondary SPC/SMC 1000b, PAC/PSC 1002a-1002d, a communication path 1004, and a synchronization path 1006. The primary SPC/SMC 1000a and the secondary SPC/SMC 1000b each includes a memory 1008, a processor 1010, a boot configuration 1012, high availability tasks 1014, resource manager 1016, switch fabric control 1018, and controller tasks 1020.

The SPC/SMC 1000 (both primary and secondary) manages and controls the network device including the other cards in the network device. The SPC/SMC 1000 can be configured in a primary and secondary arrangement that provides redundancy and failsafe protection. The modules or tasks running on the SPC/SMC 1000 are related to network device wide control and management. The boot configuration task 1012 includes information for starting up and testing the network device. The network device can also be configured to startup in different configurations and providing different implementations. These can include which functionalities and services are capable of running on the SPC/SMC 1000. The high availability task 1014 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 1000 or a PAC/PSC 1002, while some processor intensive tasks can also be performed across multiple PACs/PSCs to utilize multiple CPU resources. Distribution of these tasks is invisible to the user. The switch fabric control 1018 controls the communication paths in the network device. The controller tasks module 1020 can manage the tasks among the resources of the networks to provide, for example, VPN services, assign ports, and create, delete, and modify sessions for UE 202A.

The PAC/PSC 1002 is a high-speed processing card that is designed for packet processing and the tasks involved with providing various network functionalities on the network device. The PAC/PSC 1002 include a memory 1024, a network processing unit (NPU) 1026, a processor 1028, a hardware engine 1030, an encryption component 1032, a compression component 1034, and a filter component 1036. Hardware engines 1030 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 1002 is capable of supporting multiple contexts. The PAC/PSC 1002 is also capable of running a variety of tasks or modules. PAC/PSC 1002a provides routing managers 1022 with each covering routing of a different domain. PAC/PSC 1002b provides a session manager 1038 and an AAA manager 1040. The session manager 10310 manages one or more sessions that correspond to one or more UE 108. A session allows a UE 202A to communicate with the network for voice calls and data. The AAA manager 1040 manages accounting, authentication, and authorization with an AAA server in the network. PAC/PSC 1002c provides a DPI task 1042 and a signaling demux 1044. The DPI task 1042 provides inspection of packet information beyond layer 4 for use and analysis by the network device. The signaling demux 1044 can provide scalability of services in combination with other modules. PAC/PSC 1002d provides redundancy through standby tasks 1046. Standby tasks 1046 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x106 microprocessor.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Other embodiments are within the following claims.

What is claimed is:

1. A method comprising:
communicating, at a small cell, between a first User Equipment (UE) and a first packet core, wherein the small cell communicates with the first UE over an unlicensed wireless protocol, and wherein the first UE and the first packet core are each associated with a first wireless provider;
communicating, at the small cell, between a second UE and a second packet core, wherein the small cell communicates with the second UE over the unlicensed wireless protocol, and wherein the second UE and the second packet core are each associated with a second wireless provider; and coordinating, by a secondary Radio Resource Control (RRC) of the small cell, mobility of the first UE between the small cell and a second small cell, wherein the second small cell is to communicate between the first UE and the first packet core associated with the first wireless provider over the unlicensed wireless protocol and provide communication between at least one UE and the second packet core associated with the second wireless provider over the unlicensed wireless protocol;

wherein the first wireless provider associated with the first UE and first packet core is different from the second wireless provider associated with the second UE and the second packet core, and wherein the small cell is registered with the first and second packet cores at the same time.

2. The method of claim 1, wherein the unlicensed wireless protocol comprises License Assisted Access (LAA).

3. The method of claim 1, wherein the small cell and the UE each comprise a secondary Radio Resource Control (RRC).

4. The method of claim 3, wherein the first and second UEs communicate with the first and second wireless base stations over License Assisted Access (LAA).

5. The method of claim 3, wherein the first and second UEs are respectively associated with a first and second wireless base station, each base station comprising a primary RRC.

6. The method of claim 5, further comprising:
associating the first UE with a third base station associated with the first wireless provider; and
disassociating the first UE from the first base station, wherein the first UE remains connected to the small cell during the associating and dissociating.

7. The method of claim 5, wherein the secondary RRC coordinates mobility of the first UE between the small cell and a second small cell.

8. The method of claim 7, wherein the small cell communicates with the second small cell via an X2 interface.

9. The method of claim 1, further comprising recognizing, by the small cell, that the first UE is leaving the coverage of the small cell and sending, by the small cell to the first UE, an RRC reconfiguration request.

10. The method of claim 1, wherein the first and second wireless providers are associated with different wireless technologies.

11. A network device comprising a small cell, the small cell comprising:
a memory; and
a processor coupled to the memory;
the processor to:
communicate, at the small cell, between a first User Equipment (UE) and a first packet core, wherein the small cell communicates with the first UE over an unlicensed wireless protocol, and wherein the first UE and the first packet core are each associated with a first wireless provider;
communicate, at the small cell, between a second UE and a second packet core, wherein the small cell communicates with the second UE over the unlicensed wireless protocol, and wherein the second UE and the second packet core are each associated with a second wireless provider;
wherein the first wireless provider associated with the first UE and first packet core is different from the second wireless provider associated with the second UE and the second packet core, and wherein the small cell is registered with the first and second packet cores at the same time, and wherein a secondary Radio Resource Control (RRC) of the small cell coordinates mobility of the first UE between the small cell and a second small cell, wherein the second small cell is to communicate between the first UE and the first packet core associated with the first wireless provider over the unlicensed wireless protocol and provide communication between at least one UE and the second packet core associated with the second wireless provider over the unlicensed wireless protocol.

12. The network device of claim 11, wherein the unlicensed wireless protocol comprises License Assisted Access (LAA).

13. The network device of claim 11, wherein the small cell and the UE each further comprise a secondary Radio Resource Control (RRC).

14. The network device of claim 13, wherein the first and second UEs communicate with the first and second wireless base stations over License Assisted Access (LAA).

15. The network device of claim 13, wherein the first and second UEs are respectively associated with a first and second wireless base station, each base station comprising a primary RRC.

16. The network device of claim 15, further comprising:
associating the first UE with a third base station associated with the first wireless provider; and
dissociating the first UE from the first base station, wherein the first UE remains connected to the small cell during the associating and dissociating.

17. The network device of claim 15, wherein the secondary RRC coordinates mobility of the first UE between the small cell and a second small cell.

18. The network device of claim 17, wherein the small cell communicates with the second small cell via an X2 interface.

19. The network device of claim 11, the processor further to recognize that the first UE is leaving the coverage of the small cell and send, to the first UE, an RRC reconfiguration request.

20. The network device of claim 11, wherein the first and second wireless providers are associated with different wireless technologies.

* * * * *